(No Model.)

M. SPARMO & L. RUSSO.
CAR FENDER.

No. 573,242. Patented Dec. 15, 1896.

(No Model.) 3 Sheets—Sheet 2.

M. SPARMO & L. RUSSO.
CAR FENDER.

No. 573,242. Patented Dec. 15, 1896.

WITNESSES:

INVENTORS
M. Sparmo
L. Russo
BY
ATTORNEYS.

(No Model.) 3 Sheets—Sheet 3.

M. SPARMO & L. RUSSO.
CAR FENDER.

No. 573,242. Patented Dec. 15, 1896.

WITNESSES:

INVENTORS
M. Sparmo
BY L. Russo
ATTORNEYS

# UNITED STATES PATENT OFFICE.

MARIANO SPARMO AND LOUIS RUSSO, OF NEW YORK, N. Y.

CAR-FENDER.

SPECIFICATION forming part of Letters Patent No. 573,242, dated December 15, 1896.

Application filed July 8, 1896. Serial No. 598,423. (No model.)

*To all whom it may concern:*

Be it known that we, MARIANO SPARMO and LOUIS RUSSO, of New York city, in the county and State of New York, have invented a new and useful Improvement in Car-Fenders, of which the following is a full, clear, and exact description.

Our invention relates to an improvement in fenders for cars; and the object of the invention is to construct a fender that may be readily moved from one end of the car to the other, and which will be light, yet strong and durable.

A further object of the invention is to provide a fender which can be made in sections and capable of being folded upon itself when not needed, thereby reducing the depth of the fender, and, furthermore, to construct the fender in such manner that if in its folded position the fender should be brought in contact with a person or object such a contact will serve to release the sections, and the forward sections being spring-controlled will automatically move to a position which will insure the person or the object being taken up from a point close to the ground and transferred to the fender, which is practically of basket form.

A further object of the invention is to so construct the forward portion of the fender that when it receives a weight it will have a roller connection with the ground, and in striking a slight projection which may be in the pathway between the tracks the said fender will rise sufficiently to pass said obstruction, thereby sustaining no injury.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
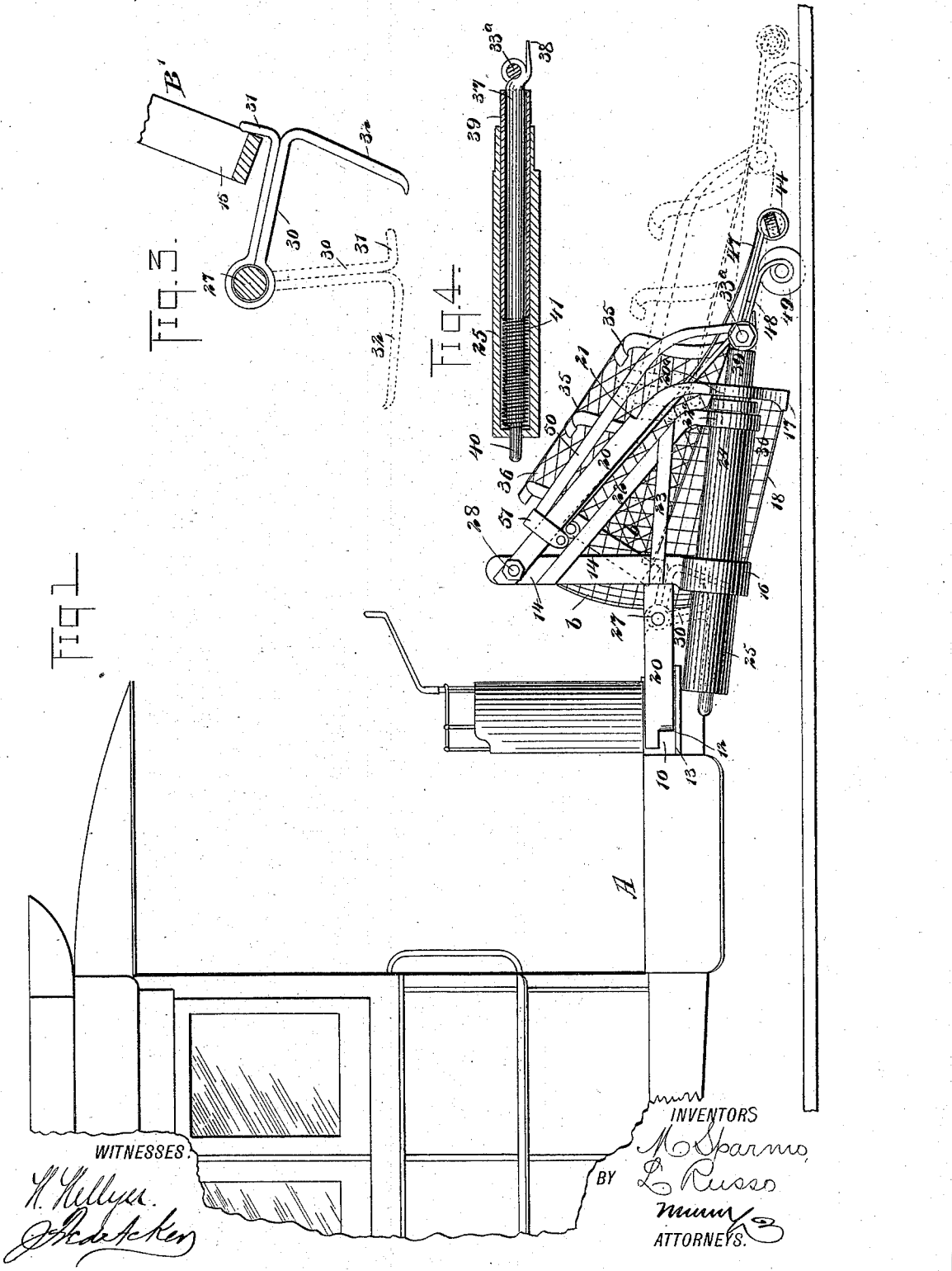
Figure 2:
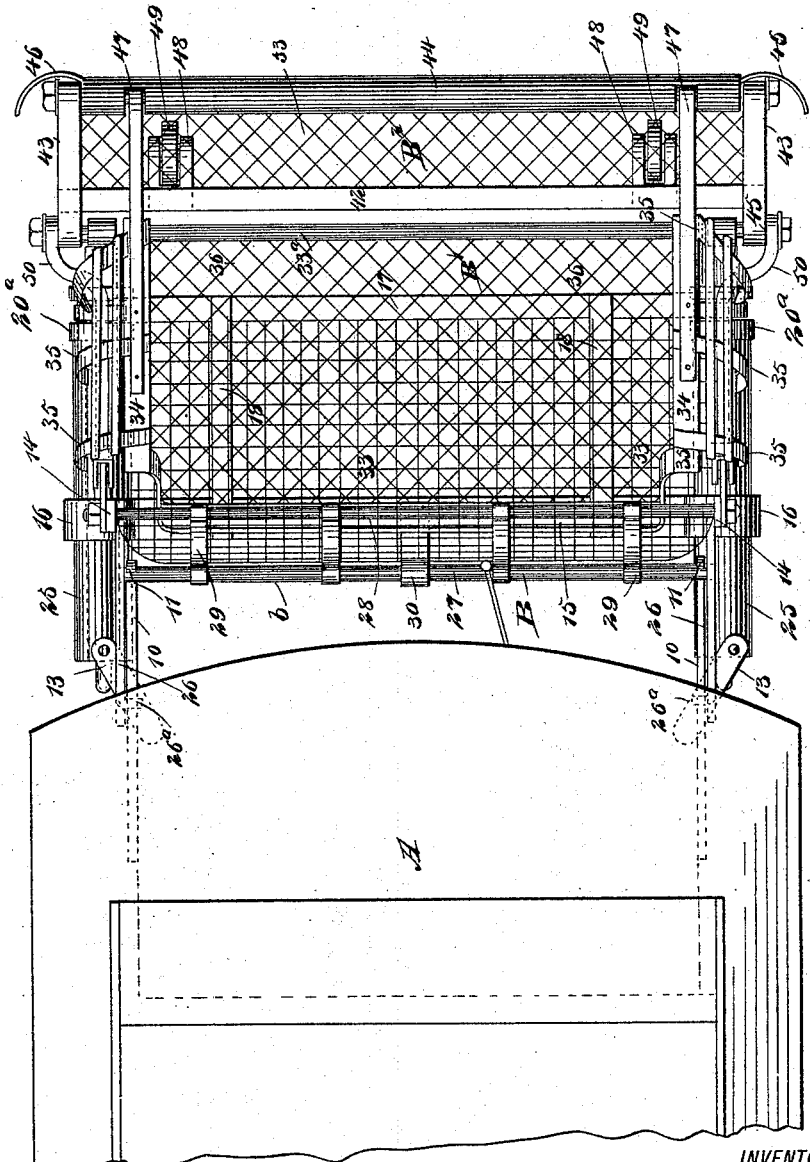
Figure 5:
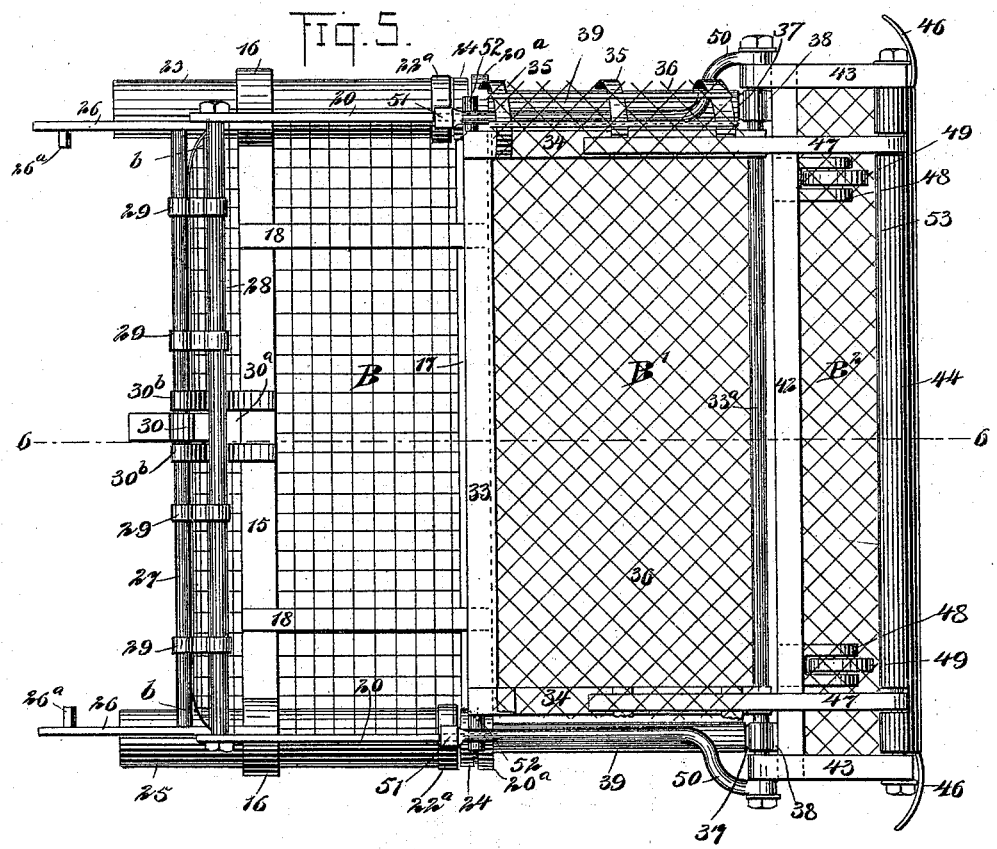
Figure 6:
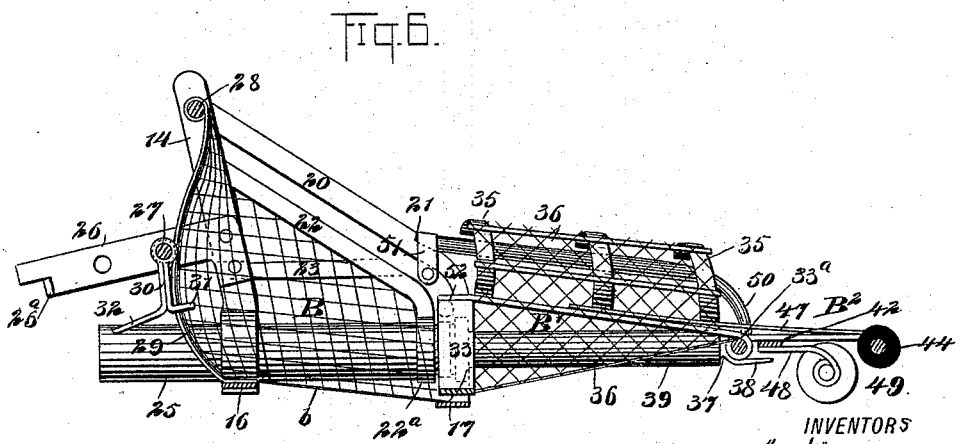

Figure 1 is a side elevation of the improved fender in its folded or collapsed condition, showing the fender extended in dotted lines. Fig. 2 is a plan view of the fender folded. Fig. 3 is a section through a shaft of the body-frame of the fender, illustrating the latch and the manner in which the latch engages with the folding frame of the fender. Fig. 4 is a detail sectional view of a cylinder and the mechanism employed to force the forward section of the fender outward. Fig. 5 is a plan view of the fender in its extended position, and Fig. 6 is a section on the line 6 6 of Fig. 5.

In carrying out the invention a horizontal arm 10 is forwardly projected from the under portion of the platform A of the car, and each of the aforesaid arms 10 is made to terminate at its forward end in a hook 11, while a slot 12 is made in the lower edge of each arm near its inner end. A button 13, or its equivalent, is pivoted beneath the car-platform at each side in such manner that the buttons may be carried over the slotted portions 12 of the aforesaid arms.

In the construction of the fender proper a fixed frame B is employed, or a frame that is to be attached directly to the car through the medium of the arms 10. This frame is constructed, preferably, in the following manner: Two uprights 14 are employed to form the back side portions of the frame, and the said uprights are connected by a cross-bar 15, and where the cross-bar meets the uprights eyes, loops, or bearings 16 are formed. A cross-bar 17 forms the forward edge of the frame, and the rear cross-bar and forward cross-bar are united by connecting-bars 18 of desired length. At each end of the forward cross-bar 17 an eye $20^a$ or its equivalent is formed, and from each of the said eyes a side bar 20 is carried upward and rearward to an engagement with the upper portions of the uprights 14, and each of these inclined side bars 20 has a recess 21 made therein near its lower end, and the lower portion of these inclined side bars is more or less rounded off. A lower and parallel side bar 22 is placed below each inclined upper side bar 20, the lower side bars being secured to the uprights 14 and terminate at their lower ends in eyes $22^a$, which are in alinement with the eyes $20^a$, and the lower inclined side bars 22 are braced near their lower ends by bars 23, which extend back to the uprights 14. A cylinder 25 is securely fastened in the eyes $20^a$ and $22^a$ at each side of the fender, and ordinarily a collar 24 is placed on each of said cylinders between the eyes $20^a$ and $22^a$, as shown in Fig. 1.

A rearwardly and downwardly extending arm 26 is projected from each of the uprights 14, and each of the fender-arms 26 has an inwardly-extending lip $26^a$ formed thereon, adapted to enter the slots 12 in the arms 10, secured to the car. A shaft 27 is securely fastened in the fender-arms 26 near their forward extremities, while a second shaft 28 is secured in the upper ends of the uprights 14, and preferably curved connecting-bars 29 are carried from the shaft 27 up to the shaft 28, and when these connecting-bars are viewed from the front their lower portions are concaved and their upper portions are convexed.

A netting $b$, preferably of wire-cloth, is secured to the upper shaft 28, the lower shaft 27, the rear cross-bar 15, and the forward cross-bar 17, the said netting being also carried upward to an engagement with the lower inclined side bars 22.

A gravity-latch 30 is fulcrumed upon the shaft 27 at or near its center, and this latch, as shown in Fig. 3, is provided with a forwardly-extending foot 31 and a rearwardly-extending foot 32 at its lower end, and the netting or bed $b$ has an opening $30^a$ therein to receive the latch, the side walls of the opening being guarded by curved protecting strips or plates $30^b$, as shown in Fig. 5.

A second frame B' is mounted to slide upon the upper face of the fixed frame B. The said second or sliding frame B' consists of a downwardly-arched rear bar 33, a shaft $33^a$, forming the front of the frame, and side bars 34, which connect the upper portions of the rear bar 33 with the shaft $33^a$. Guide-bars 35 are secured to the upper face of the side bars 34, and these guide-bars are curved upwardly and rearwardly, and a netting 36, preferably of wire-cloth, is secured to the rear bar 33, the shaft $33^a$, the side bars 34, and also the upper side guide-bars 35 in any suitable or approved manner.

A tube 39 is held to slide in each cylinder 25, and in each tube a sliding bar 37 is located, and each bar is provided with a head at its forward end, the said head being in the nature of an eye, and these eyes receive the end portions of the shaft $33^a$ of the aforesaid sliding frame. Each sliding bar 37 is further provided with a forwardly-extending lip 38 at the lower portion of its forward end. Each sliding bar is made to pass beyond the inner tube 39, in which it is contained, and has a reduced rear end 40, which passes through an opening in the rear end of the cylinder 24, in which the rod is placed, and a spring 41 is coiled around the rear portion of each sliding rod 37 within the cylinder 34, in which the rod has movement, the spring bearing against the rear head of the cylinder and the inner or rear end of the tube 39, contained in the cylinder. The tubes 39 are therefore telescopic and virtually constitute a portion of the cylinders.

In addition to the forward sliding frame B' a forward receiving-frame B² is provided, and this receiving-frame consists of a rear cross-bar 42, side bars 43, and a front bar, which is covered by a tube 44, of rubber or a like material, the said tube serving as a cushion. The receiving-frame B² is hinged to the sliding frame B' by forming eyes 45 at the rear of its side pieces, the said eyes being loosely mounted upon the projecting ends of the tube $33^a$, forming the forward bar of the sliding frame B', and near each end of the cushioned bar of the receiving-frame a guard 46 is located, the said guards being curved rearwardly and extending across and beyond the forward ends of the sides of the receiving-frame, and the guards serve to direct persons struck thereby toward the outer sides of the tracks. The downward movement of the receiving-frame is limited by engagement with the lips or projections 38 from the sliding bars 37 of the cylinders, and the said receiving-frame is limited in its upward movement by springs 47, which are secured to the sliding frame and have bearing on the cushioned bar of the receiving-frame. Since the sliding and receiving frames are connected, they naturally move together. Bearings 48 are projected downwardly and forwardly from the rear bar of the receiving-frame, and in each of the said bearings a wheel or roller 49 is journaled, so that when the receiving-frame is pressed downward these rollers will travel on the surface between the rails.

When the receiving-frame and sliding frame are carried rearward, as shown in Figs. 1 and 2, in order to reduce the depth of the fender, the said two frames B' and B² will be held in engagement with and over the stationary frame B by causing the forward foot 31 of the gravity-latch to engage with the under forward face of the rear bar of the sliding frame B', and when the sliding and receiving frames are carried forward to operative position they are held in such position through the medium of locking-arms 50, which locking-arms are pivoted upon the outer ends of the shaft $33^a$ and have sleeves 51, attached to their rear ends, loosely sliding on the upper inclined side bars 20 of the fixed frame, and these sleeves enter and engage with the rear walls of the recesses 21 in the aforesaid upper inclined side bars, as shown in Fig. 5. The movement of the sliding frame over the fixed frame is controlled by pins 52, which extend outwardly from the side bars of the sliding frame at their rear ends and into the space between the upper and the lower inclined side bars 22 and 20 of the fixed frame.

In operation, the sliding frame being in its rearward position over the fixed frame, in the event the cushion 44 on the receiving-frame should contact with an object or a person in the path of the car the receiving-frame will be carried backward sufficiently to release it from the latch 30, and the latch dropping downward will be out of the way of the receiving-frame, and the spring-controlled sliding or piston rods 37 in the cylinders will force the sliding and receiving frames to their outermost position, in which position they will be automatically locked by the rod-sleeves 51, as above stated.

It is evident that a fender constructed as above described may be made exceedingly light, durable, and economic, and may be quickly attached to a car and readily transferred from one end of the car to the other.

In applying the fender to a car the rear shaft 27 is made to enter the hooks 11 in the arms 10, projected from the car, and the offsets or lugs 26ª of the fender-arms will enter the slots 12ª in the arms of the car-platform, and the fender will be prevented from shifting when the buttons 13 are carried over the recesses 12 and beneath the fender-arms, and these buttons may be attached to the cylinders in such manner that they cannot be discharged until their adjustment is required. It will be understood that a bed 53, of wire-netting or other material, is provided for the receiving-frame.

Having thus described our invention, we claim as new and desire to secure by Letters Patent—

1. In a car-fender, the combination, of a frame adapted for attachment to a car, a second frame having spring-controlled sliding movement upon the attached frame, latches respectively arranged to hold the sliding frame in a forward and in a rearward position, a receiving-frame having a hinge connection with the sliding frame and capable of vertical movement, downwardly-pressing springs having bearing upon the upper surface of the receiving-frame, and wheels connected with the lower surface of the said receiving-frame, as and for the purpose set forth.

2. In a car-fender, the combination, of a frame adapted for attachment to a car, a second frame having spring-controlled sliding movement upon the attached frame, latches respectively arranged to hold the sliding frame in a forward and in a rearward position, a receiving-frame hinged to the sliding frame and capable of vertical movement, downwardly-pressing springs having bearing upon the upper surface of the receiving-frame, wheels connected with the lower portion of the said receiving-frame, a cushion located on the forward edge of the said receiving-frame, and guards extending laterally and rearwardly from the ends of the cushioned portion of the receiving-frame, as and for the purpose specified.

3. In a car-fender, the combination, of arms projected from the car-body, the arms having sockets formed therein and having recesses at the rear of the sockets, pivoted locking devices supported from the car and arranged to pass below the recesses in the arms projecting from the car, a fender having rearwardly-extending arms provided with offsets to enter the recesses in the arms from the car, and a shaft connected with the fender-arms and arranged to enter the sockets in the projecting arms from the car, as and for the purpose set forth.

4. The combination with a car, of two arms projecting outward from the car, the arms having hooks at their outer extremities and slots formed in their main portions, a fixed fender-section having rearwardly-projecting arms each having a hook, the hooks of the latter arms respectively extending into the slots of the arms on the car and the hooks of the former arms engaging the fixed fender-section, and a sliding fender-section carried by the fixed section, substantially as described.

5. The combination with a car having two arms projecting outwardly therefrom, each arm having a hook and a slot, of a fixed fender-section, and two arms projecting from the fender-section each arm having a hook respectively fitting in the hooks of the arms on the car and the hooks of said car-arms being engaged with the fender-section, substantially as described.

6. A car-fender having a fixed fender-section, two tubes held by the fixed fender-section, a rod sliding in each tube, a spring pressing each rod, a shaft journaled in the forward portions of the rods, and a sliding fender-frame pivotally connected to the shaft, the sliding frame being movable with the rods and shaft to project forward of the fixed section, or to lie over said section, substantially as described.

7. A car-fender having a fixed fender-section provided with an upwardly-inclined slideway, a tube held by the fixed fender-section, a rod slidable within the tube, a spring pressing the rod, a shaft connected with the rod, the rod being reciprocal through the tube, and a sliding frame pivotally connected to the rod and movable in the slideway of the fixed section, substantially as described.

8. In a car-fender, a fixed fender-section, a tube carried by the fixed section, a rod reciprocal within the tube, a shaft connected to the rod, a sliding frame pivoted to the rod and having guided movement on the fixed fender-section, and a receiving fender-section pivotally connected to the rod and projecting forwardly thereof, substantially as described.

9. A car-fender having a fixed fender-section provided with two tubes, a rod movable in each tube, a shaft connected to the forward extremities of the rod, a sliding fender-section pivotally connected to the shaft and having movement on the fixed section, a receiving fender-section pivotally connected to the rod and projecting forward thereof, and a spring carried by the sliding section and pressing downward on the receiving-section, substantially as described.

MARIANO SPARMO.
LOUIS RUSSO.

Witnesses:
LUCIO ZUMBO,
GAETANO MALGOUN.